United States Patent [19]

Lojek

[11] Patent Number: 5,571,302
[45] Date of Patent: *Nov. 5, 1996

[54] FERTILIZATION OF TREES

[75] Inventor: John S. Lojek, Elmira, Canada

[73] Assignee: Terra Care International Corporation, Canada

[*] Notice: The term of this patent shall not extend beyond the expiration date of Pat. No. 5,478,373.

[21] Appl. No.: 467,539

[22] Filed: Jun. 6, 1995

Related U.S. Application Data

[63] Continuation of Ser. No. 190,202, Aug. 19, 1992, Pat. No. 5,478,373.

[30] Foreign Application Priority Data

Aug. 8, 1991 [GB] United Kingdom .................. 9117115

[51] Int. Cl.$^6$ ..................................................... C05F 1/00
[52] U.S. Cl. ........................................................ 71/17; 71/18
[58] Field of Search ................................ 71/11, 20, 15, 71/17, 18, 19

[56] References Cited

U.S. PATENT DOCUMENTS

| 3,050,383 | 8/1962 | Wilson | 71/11 |
| 5,240,490 | 8/1993 | Moore | 71/17 |

*Primary Examiner*—Wayne Langel
*Attorney, Agent, or Firm*—Sim & McBurney

[57] ABSTRACT

Trees are fertilized with natural ingredients commonly used in the feed industry to prevent, combat and reverse die-back damage in trees. The fertilizer composition employed preferably uses either feather meal or blood meal and bone meal, along with sulfate of potash or sulfate of potash magnesia to provide a ratio of N:P:K of about 4:4:8 wt. %.

3 Claims, No Drawings

FERTILIZATION OF TREES

This is a continuation of application Ser. No. 08/190,202, filed Aug. 6, 1992, U.S. Pat. No. 5,478,373.

FIELD OF INVENTION

The present invention relates to the fertilization of trees to combat and reverse die-back damage to tree growth.

BACKGROUND TO THE INVENTION

It is generally believed that trees are able to obtain all their nutrients and water from the soil. While this is possible under ideal conditions, very often growing conditions are not ideal, which leads to poor growth. To enhance their chances for survival, the roots of trees and soil organisms have developed a symbiotic existence. The trees manufacture by photosynthesis and donate energy, in the form of sugars, to the microorganisms, which then employ the sugars to decompose organic matter and rocks to release nutrients. Such decomposition results in more nutrients than the microorganisms need and the excess is transferred to feeder roots of the tree. In this way, difficult to obtain nutrients, such as phosphorus and micronutrients, are obtained by the roots.

Under normal circumstances, this symbiotic system provides enough minerals for trees to grow and enough energy for the microorganisms to survive. However, any occurrence which diminishes the rate of photosynthesis, results in a decline of tree growth and microorganism population. For example, during the last century, industry has generated a variety of toxic chemicals which have been placed in the atmosphere.

One of the worst pollutants from the perspective of a tree is ground level ozone. This gas enters the plant, penetrates cell walls and damages cell membranes. To prevent loss of cell content, the cell tries to repair itself and, in so doing, cuts back on photosynthesis and uses energy, as well as activating many enzymes which results in an increased need for nutrients. The ozone also interferes with the transfer of sugar from leaves to roots, which leads to a low energy level for the microorganisms and poor uptake of nutrients by the feeder roots.

As the microorganism population declines as a result of a decrease in available energy, the roots of the tree cannot feed the whole canopy of the tree, resulting in the initiation of die-back. Prior to the inventors discovery thereof, it is thought that the mechanism of die-back of trees as outlined above was not understood, although several theories had been proposed. No known chemical fertilizer is able to prevent or cure the problem.

SUMMARY OF INVENTION

Accordingly, the present invention provides a method of fertilizing trees to prevent, combat and reverse die-back damage in trees, both coniferous and deciduous, by providing a nutrient system which regenerates, maintains and increases the survival of the microbial population. The regeneration of the microbial population results in regeneration of the root system of the tree, leading to recovery of the tree, despite the presence of ground-level ozone, other oxidants or road salt damage. Similarly, the fertilization procedure combats the on-set of tree die-back by maintaining the microbial population.

GENERAL DESCRIPTION OF INVENTION

The nutrient system employed herein to effect fertilization uses natural ingredients commonly used in the feed industry. Examples of materials which can be used are bone meal, blood meal and feather meal, as well as sugars. The components are formulated to provide a fertilizer which is applied to the root system of a tree under treatment.

The composition which is employed in the present invention comprises natural components formulated to provide a ratio of nitrogen, phosphorus and potassium in the composition corresponding to about 3 to 5 wt % nitrogen, about 3 to 5 wt % phosphorus and about 6 to 10 wt % potassium, preferably about 4 wt % N, about 4 wt % P and about 8 wt % K.

Preferably, the nitrogen is provided by feather meal or blood meal, the phosphorus is provided by bone meal and the potassium is provided by sulfate of potash or sulfate of potash magnesia.

The composition may be provided in any desired physical form. One convenient physical form is granular, which may be formed using conventional granulating equipment.

The composition of the invention may be employed to prevent the on-set of die-back disease by maintaining the microbial population at the required level. The composition of the invention also enables die-back damage in trees to be combatted by regenerating the microbial population.

The composition of the invention employs natural components, in contrast to chemical fertilizers commonly used. As noted above, there is no known chemical fertilizer able to achieve the results obtained herein. The composition of the invention is slow release, long-lasting, non-burning to trees and contains micronutrients.

SUMMARY OF DISCLOSURE

In summary of this disclosure, the present invention provides a novel method of preventing and curing die-back disease in trees by maintaining the soil microorganism population and to novel fertilizing composition containing natural components commonly employed in the feed industry. Modifications are possible within the scope of this invention.

What we claim is:

1. A fertilizer composition for preventing the on-set of or combatting die-back damage in a tree comprising about 3 to 5 wt % nitrogen, about 3 to 5 wt % phosphorus and about 6 to 10 wt % potassium, wherein said nitrogen, phosphorus and potassium are provided solely by natural components and wherein said nitrogen is provided by feather meal, said phosphorus is provided by bone meal and said potassium is provided by sulfate of potash.

2. The composition of claim 1 wherein said weight ratio is about 4 wt % N, about 4 wt % P and about 8 wt % K.

3. The composition of claim 1 wherein said composition is in granular form.

* * * * *